(12) United States Patent
Salazar

(10) Patent No.: US 6,742,979 B1
(45) Date of Patent: Jun. 1, 2004

(54) RETRACTABLE CARGO BOX

(76) Inventor: Felix D. Salazar, 1509 Oleander Ave., Chula Vista, CA (US) 91911

( * ) Notice: Subject to any disclaimer, the term of this patent is extended or adjusted under 35 U.S.C. 154(b) by 0 days.

(21) Appl. No.: 10/266,208

(22) Filed: Oct. 7, 2002

(51) Int. Cl.$^7$ ................................................. B60P 1/00
(52) U.S. Cl. ..................................... 414/522; 296/37.6
(58) Field of Search .......................... 414/522; 296/37.6, 296/37.7

(56) References Cited

U.S. PATENT DOCUMENTS

| | | | | |
|---|---|---|---|---|
| 4,824,158 A | * | 4/1989 | Peters et al. ................ | 296/37.6 |
| 5,456,511 A | * | 10/1995 | Webber ..................... | 296/26.09 |
| 5,593,272 A | * | 1/1997 | Green ........................ | 414/498 |
| 5,685,593 A | * | 11/1997 | O'Connor ................... | 296/39.2 |
| 5,755,480 A | * | 5/1998 | Bryan ...................... | 296/26.01 |
| 5,979,725 A | * | 11/1999 | Lehrman ..................... | 224/539 |
| 5,996,868 A | * | 12/1999 | Paradis ....................... | 224/404 |
| 6,116,673 A | * | 9/2000 | Clonan ....................... | 296/37.6 |
| 6,155,622 A | * | 12/2000 | Reed ........................ | 296/26.08 |
| 6,644,708 B1 | * | 11/2003 | Grzegorzewski et al. ..... | 296/32 |

* cited by examiner

Primary Examiner—Richard Ridley

(57) ABSTRACT

The present invention is for a slide-out cargo container for the baggage compartments of passenger buses. The retractable cargo box would enable luggage to be easily loaded and unloaded, eliminating undue back and shoulder strain from lifting heavy baggage at uncomfortable angles. Made of a strong, lightweight material such as aluminum, the retractable cargo box would be dimensioned to fit inside the existing luggage compartment at the lower side of the bus. Wheels along the lower left and right sides of the box would glide along special guide tracks to allow the container to be easily extended from and retracted into the baggage compartment. Two doors would be located at the front of the cargo box to eliminate the need to lift heavy luggage over the sides of the box. Door stops would ensure proper closure of the doors, and a safety hook would keep the doors from popping open. To secure the cargo box against movement during transit, a large vertical bolt attached to the front of the cargo box would be engaged in a hole in the cargo compartment. The dimensions of the cargo box could be altered for use in recreational vehicles, aircraft, trains, trucks, and other types of vehicles.

20 Claims, 3 Drawing Sheets

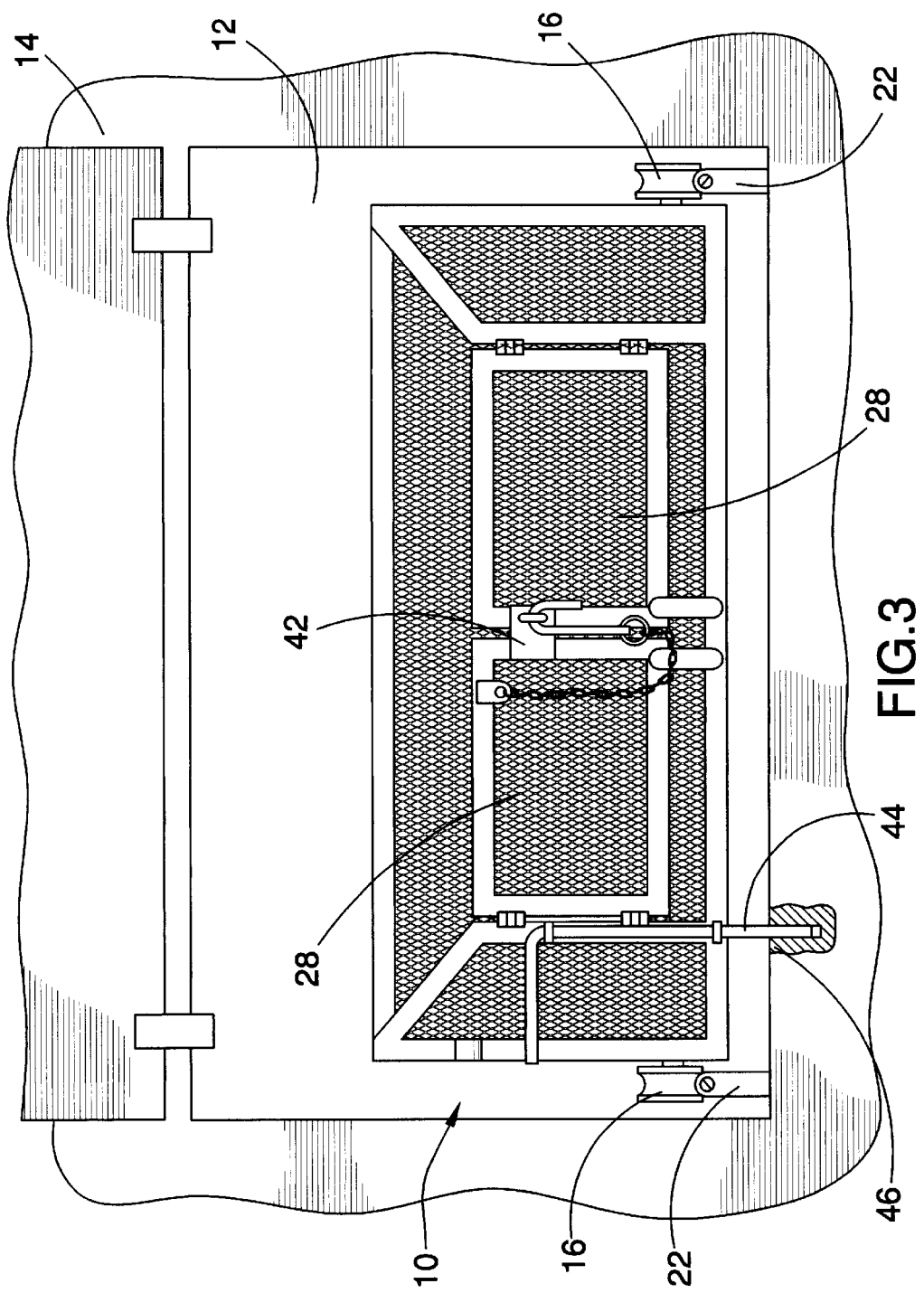

RETRACTABLE CARGO BOX

BACKGROUND OF THE INVENTION

1. Field of the Invention

The present invention relates to a retractable cargo box for use in connection with baggage compartments located in buses, recreational vehicles, aircraft, trains, trucks, and other types of vehicles and equipment. The retractable cargo bin has particular utility in connection with minimizing the amount of strain placed on the body, especially the back and shoulders, when loading and unloading baggage from these compartments.

2. Description of the Prior Art

Improper lifting of heavy cargo can cause medical problems such as back and neck injuries. Large storage compartments in buses, planes, trains, and other vehicles tend to be long and narrow, prohibiting workers from being able to stand in the proper position to stow or retrieve baggage and other cargo. Retractable cargo bins are desirable for providing easy access to baggage especially that stored in the back of the storage compartment. In this way, unnecessary loads on one's back and legs due to heavy lifting at unusual angles can be avoided. In addition to alleviating undue stress on an individual's body while stowing and retrieving baggage, cargo bins can help cargo maintain its original placement while in transit, reducing the risk of damage to both the cargo and the vehicle due to shifting cargo.

The use of retractable cargo bins is known in the prior art. For example, U.S. Pat. No. 6,022,181 to Niclas E. Wolterstorff and Bruce E. Leonard discloses a toploading and retractable passenger bus cargo handling system. However, the Wolterstorff, et al. '181 patent does not provide either a rear or front wall for the cargo system, which could lead to items falling from or inadvertently being pushed off the back end of the device during storage and retrieval of cargo. Additionally, an item that was accidentally pushed off the back end of the device while cargo was being stowed could be caught between the cargo box and the wall of the bus when the cargo box is fully inserted into the bus, leading to damaged luggage as well as broken or damaged items within the luggage.

U.S. Pat. No. 5,564,767 to John E. Strepek discloses a motorized extendable drawer apparatus for a vehicle. However, the Strepek, et al. '767 patent does not provide a wall on the rearward end of the cargo box, which could lead to baggage shifting or falling off when the device is pulled out from the vehicle. Furthermore, the Strepek, et al. '767 device is motorized, leading to a more complex manufacturing process and a higher cost.

Similarly, U.S. Pat. No. 4,681,360 to Richard E. Peters and Larry J. Parlette discloses a combination access box and bed liner for vehicles. However, the Peters, et al. '360 patent does not provide a wall on the rearward end of the cargo box, which could lead to baggage shifting or falling off when the device is extended from the vehicle.

U.S. Pat. No. 6,095,585 to Stig Pilhall discloses a sliding cargo floor for use in larger vehicles such as station wagons, vans, and sports utility vehicles. However, the Pilhall '585 patent does not provide any walls to retain the cargo in its original position, which could lead to possible injury or damage to stored items due to cargo falling off the device once it is extended from the vehicle. Additionally the Pilhall '585 device does not provide a locking mechanism for the cargo floor, thus it could inadvertently slide out of the vehicle, once again causing injury or damage to cargo, especially if the vehicle were not parked on a flat surface.

Likewise, U.S. Pat. No. 5,931,632 to Craig Dongilli and Jeanette Dongilli discloses a slideable and removable truck bed multi-compartment system. While the Dongilli, et al. '632 patent provides a sliding mechanism for the compartment, it does not provide a means for opening the end of the compartment, requiring an individual to lift cargo up and over the edges of the compartment. This could lead to additional strain on a worker lifting heavy bags and boxes on a continuous basis. Additionally, the Dongilli, et al. '632 device does not provide a locking mechanism for holding the compartment in place while the vehicle is moving, instead relying on the tailgate of the truck to keep the unit for sliding. When the storage hatch for a bus was opened, the compartment might slide forward, injuring a worker or bystander.

U.S. Pat. No. Des. 425,825 to Thomas Allan Shambeau and Loren Fredrick Hansen discloses the ornamental design for a cargo box. Although, the Shambeau, et al. '825 patent has four sides to maintain the placement of any baggage it contains, the Shambeau, et al. '825 makes no provision for the cargo box to be retractable. Therefore, it would still require a worker to reach to the back of the compartment and lift heavy pieces at an awkward angle, placing his back and shoulder under an unnatural amount of strain.

Lastly, U.S. Pat. No. 5,125,710 to Angelo Gianelo discloses an under-platform drawer for trucks that is mounted under the truck bed. However, the Gianelo '710 patent would not be useful for buses and other vehicles that do not have sufficient space under the body of the vehicle for such a device. Additionally, since the Gianelo '710 device is suspended from a pair of guide rails, it would be impractical to load large amounts of baggage in it since it would be under an undue amount of stress.

While the above-described devices fulfill their respective, particular objectives and requirements, the aforementioned patents do not describe a retractable cargo box that allows safe, easy, and convenient storage and retrieval of all baggage stored in a luggage compartment. The Wolterstorff, et al. '181, Strepek, et al. '767, Peters, et al. '360, and Pilhall '585 patents each lack a four wall system for holding the cargo. The Wolterstorff, et al. '181 patent does not provide either a rear or front wall for the cargo system, leading to the possibility that an item could be damaged if it fell or was pushed off the device during storage and retrieval of cargo. Additionally, an item that was accidentally pushed off the back end of the Wolterstorff, et al. '181 device while cargo was being stowed could be caught between the cargo box and the wall of the bus when the cargo box was fully inserted into the bus, leading to damaged luggage as well as broken or damaged items within the luggage. The Strepek, et al. '767 and the Peters, et al. '3.60 patents do not provide a wall on the rearward end of the cargo box, which could lead to baggage shifting or falling when the device is pulled out from the vehicle. The Pilhall '585 patent does not provide any walls to retain the cargo in its original position, which could lead to possible injury or damage to stored items due to cargo falling off the device once it is extended out of the vehicle. Neither the Pilhall '585 nor the Dongilli, et al. '632 device provides a locking mechanism for the cargo floor, thus it could inadvertently slide out of the vehicle, once again causing injury or damage to cargo, especially if the vehicle were not parked on a flat surface. Furthermore, the Dongilli, et al. '632 patent does not provide a means for opening the end of the compartment, requiring an individual to lift cargo up and over the edges of the compartment. This could lead to additional strain on a worker lifting heavy bags and boxes on a continuous basis. Additionally, the Strepek, et al. '767 device is motorized, leading to a more complex manufacturing process and a higher cost. The Shambeau, et al. '825 makes no provision for the cargo box to be retractable; therefore, it would still require a worker to reach to the back of the compartment and lift heavy pieces at an awkward angle, placing his back and shoulder under an unnatural amount of strain. Finally, the Gianelo '710 patent would not be useful for buses and other vehicles that do not have sufficient space under the body of the vehicle for such a device, especially because the device is suspended from a pair of guide rails and would be impractical for large amounts of baggage since the rails would be placed under an undue amount of stress.

Therefore, a need exists for a new and improved retractable cargo box that can be used for easily and safely stowing, transporting, and retrieving baggage in vehicles such as buses and trains. In this regard, the present invention substantially fulfills this need. In this respect, the retractable cargo box according to the present invention substantially departs from the conventional concepts and designs of the prior art, and in doing so provides an apparatus primarily developed for the purpose of minimizing the amount of strain placed on the body, especially the back and shoulders, and the amount of damage sustained by baggage when loading, transporting, and retrieving baggage from cargo compartments such as those found in buses and trains.

SUMMARY OF THE INVENTION

In view of the foregoing disadvantages inherent in the known types of retractable cargo boxes now present in the prior art, the present invention provides an improved retractable cargo box, and overcomes the above-mentioned disadvantages and drawbacks of the prior art. As such, the general purpose of the present invention, which will be described subsequently in greater detail, is to provide a new and improved retractable cargo box which has all the advantages of the prior art mentioned heretofore and many novel features that result in a retractable cargo box which is not anticipated, rendered obvious, suggested, or even implied by the prior art, either alone or in any combination thereof.

To attain this, the present invention essentially comprises a sturdy framework with walls forming a rectangular cargo box, open on the top, with a pair of access doors at the front. The cargo box has wheels attached on the right and left sides which are formed to slide upon a pair of guide rails, allowing the box to easily move upon the rails.

There has thus been outlined, rather broadly, the more important features of the invention in order that the detailed description thereof that follows may be better understood and in order that the present contribution to the art may be better appreciated.

The invention may also include door stops to ensure proper door closure, a safety latch and hook to ensure that the doors remain closed during transit, and a locking bolt to immobilize the cargo bin during transit. There are, of course, additional features of the invention that will be described hereinafter and which will form the subject matter of the claims attached.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved retractable cargo box that has all of the advantages of the prior art retractable cargo boxes and none of the disadvantages.

It is another object of the present invention to provide a new and improved retractable cargo box that may be easily and efficiently manufactured and marketed.

An even further object of the present invention is to provide a new and improved retractable cargo box that has a low cost of manufacture with regard to both materials and labor, and which accordingly is then susceptible of low prices of sale to the consuming public, thereby making such a retractable cargo box economically available to the buying public.

Still another object of the present invention is to provide a new retractable cargo box that provides in the apparatuses and methods of the prior art some of the advantages thereof, while simultaneously overcoming some of the disadvantages normally associated therewith.

Even still another object of the present invention is to provide a retractable cargo box for providing easy access to all cargo stored in a luggage compartment. This eliminates undue back and shoulder strain that occurs when reaching and lifting baggage from the back of a compartment, especially when dealing with heavy cargo.

Yet another object of the present invention is to provide a retractable cargo box that minimizes the damage done to stored cargo while in transit. The retractable cargo box set forth in the attached claims allows cargo to be loaded in a more organized fashion and minimizes the shifting and movement of stored luggage.

Lastly, it is an object of the present invention to provide a new and improved retractable cargo box for safe, easy, and convenient storage and retrieval of all baggage stored in a luggage compartment. This reduces the amount of time and injuries involved in this process.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a front elevation view of the retractable cargo box of the present invention.

The same reference numerals refer to the same parts throughout the various figures.

DESCRIPTION OF THE PREFERRED EMBODIMENT

Figure 1:
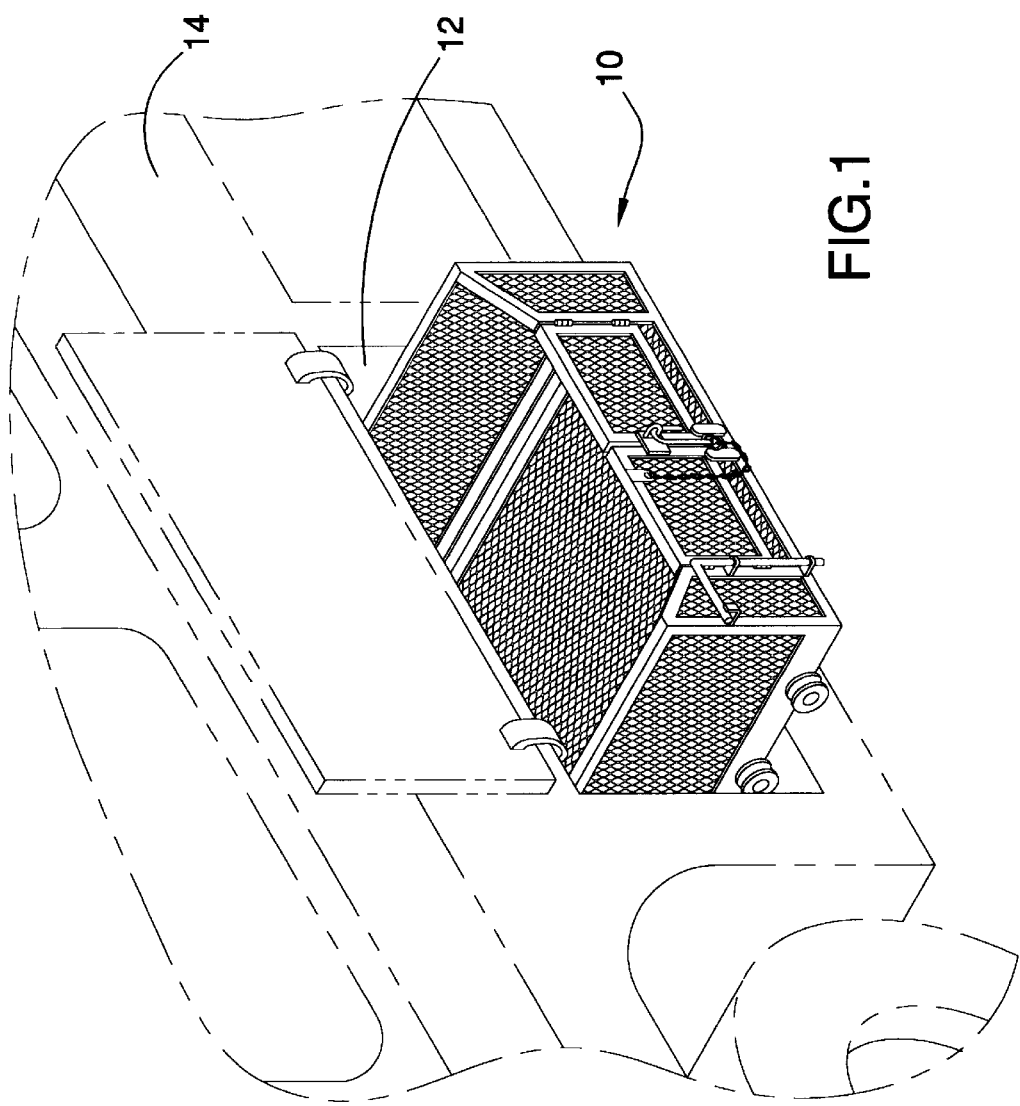
FIG. 1 is a side perspective view of the preferred embodiment of the retractable cargo box constructed in accordance with the principles of the present invention and installed in the cargo bin of a passenger bus.
Figure 2:
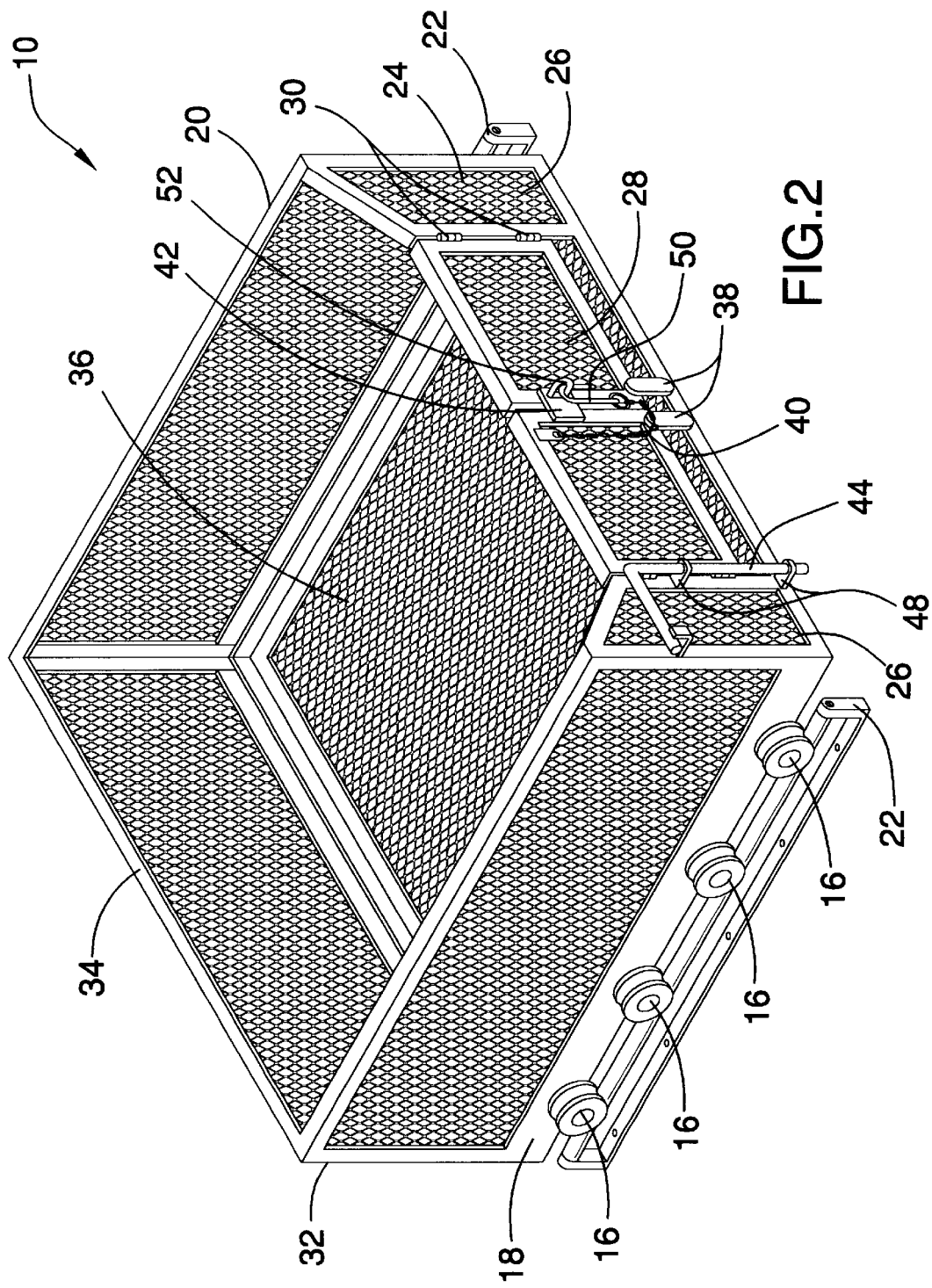
FIG. 2 is a side perspective view of the retractable cargo box of the present invention.

Referring now to the drawings, and particularly to FIGS. 1–3, a preferred embodiment of the retractable cargo box of the present invention is shown and generally designated by the reference numeral 10.

In FIG. 1, a new and improved retractable cargo box 10 of the present invention for safely and easily stowing, transporting, and retrieving cargo from a luggage compartment in a vehicle such as a bus is illustrated and will be described. More particularly, the retractable cargo box 10 is shown installed in the cargo bin 12 of a passenger bus 14.

FIG. 2 shows a side perspective of the retractable cargo box 10 before installation in the cargo bin of a vehicle. The retractable cargo box 10 has channel wheels 16 along the lower right and left side, 18 and 20, which roll along special guide rails 22 for retraction and extension. The guide rails 22 would be placed parallel to one another and affixed to the floor of the vehicle's cargo compartment. There are four channel wheels 16 along each side of the retractable cargo box 10; however, this number could be altered if necessary. The front 24 of the retractable cargo box 10 would be tapered downward and inward at the upper left and right corners, forming a pair of immediate side walls 26 with attached side-by-side access doors 28. The two rectangular access doors 28 have hinges 30 at the outer edges so that they can be opened together from the center to provide maximum access to the cargo being carried and door stops 50 at the bottom innermost position of each door 28 to ensure proper closure. The retractable cargo box 10 would consist of a sturdy aluminum frame 32 with lightweight aluminum mesh walls at the rear 34, bottom 36, side walls 26, access doors 28, and right and left sides, 18 and 20. It would measure approximately 20 inches tall, 47 inches long, and 47 inches wide, although these measurements could be altered for a vehicle with a different size luggage compartment. A J-shaped hook 38 at the end of a safety chain 40, located at the upper inside corner of the left door 28, would ensure that the doors 28 would not inadvertently come open. The hook 38 would pass through U-shaped staple 52 which effectively secures the doors 28 with a hasp 42. A large vertical bolt 44, located alongside the left edge of the left door 28, would be dropped into a hole in the cargo bin's floor 46 to effectively immobilize the retractable cargo box 10 during transit. This L-shaped bolt 44 is engaged within two mounted eyelets 48, one above the other, so that it can be easily lifted and suspended on a retainer when not needed.

FIG. 3 is a front elevation of the retractable cargo box 10 mounted within the cargo bin 12 of a passenger bus 14. From this view the parallel guide rails 22 for retraction and extension can be seen. The channel wheels 16 are formed such that they are slightly concave on the edges, forming a channel which conforms to the guide rail 22. The nature of the fastening hasp 42 for the access doors 28 is also more apparent from this view. The locking bolt 44 is shown engaged with the cargo bin's floor 46, effectively immobilizing the retractable cargo box 10 during transit.

In use, it can now be understood that the retractable cargo box 10 would be installed by affixing the guide rails 22 at the proper distance from and parallel to one another on the cargo bin floor 46. The retractable cargo box 10 would then be placed on the guide rails 22 by fitting the wheels 16 over the guide rails 22. Once installed, the aluminum retractable cargo bin 10 could be pulled outward away from the cargo bin 12 and loaded with passenger luggage. After the access doors 28 are closed and locked with the J-shaped hook 38 and fastening hasp 42, the box would be pushed inside the cargo bin 12, where it would be secured with the locking bolt 44 before closing the side access door of the cargo bin. Upon arriving at the intended destination, the process could be reversed to easily access and unload the retractable cargo box 10.

While a preferred embodiment of the retractable cargo box has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, any suitable sturdy lightweight material such as metal, plastic, or a variety of wood may be used instead of the aluminum described. And although providing convenient and safe access to luggage in the cargo bin of a passenger bus has been described as the main function, it should be appreciated that the retractable cargo bin herein described is also suitable for insertion into storage sheds, campers, closets, trains, airplanes, recreational vehicles, truck beds, and underneath beds.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A retractable cargo box comprising:
    a plurality of flat, elongated, rectangular panels each having a front and a back and integrally coupled to one another to form a rectangular box having a bottom, front, rear, right side, and left side and connected on said right side and said left side to said wheels;
    a rectangular frame having a box shape and connected to said rectangular box formed by said elongated panels such that frame supports the outer edges of each said panel;
    a plurality of wheels connected to said frame where it supports said right side and said left side of said box formed by said panels; and,
    a plurality of guide rails connected to said wheels.

2. The cargo box of claim 1 wherein said guide rail further comprises:

an elongated bar having two ends and a base portion and formed such that said ends are bent in an upward perpendicular direction from said base portion; and a cylindrical rod having two ends and connected to said bar such that said first end of said rod is connected to said first end of said bar and said second end of said rod is connected to said second end of said bar in such a way that said rod is suspended above said base portion of said bar.

3. The cargo box of claim 2 wherein said wheels have an outer edge, a middle portion, and an inner edge and are formed such that said outer edge and said inner edge have the same diameter and said middle portion is arced in a concave direction to said outer edge and said inner edge such that a groove is formed.

4. The cargo box of claim 3 wherein said grooves of said wheels are placed on top of said rod of said guide rail such that said rod forms a track along which said wheels can easily roll.

5. The cargo box of claim 1 wherein said frame is of such a dimension that said frame fits within the cargo compartment of a passenger bus.

6. The cargo box of claim 1 wherein said elongated panels are made of a sturdy, lightweight material such as aluminum mesh.

7. The cargo box of claim 1 wherein said front panel of said rectangular box has a top, a bottom, a right side, and a left side and further comprises:

a pair of side walls, each having a right side and a left side, and connected to said frame such that said left side of first said side wall is connected to said frame and said right side of said second side wall is connected to said frame;

a plurality of hinges connected to said right side of said first side wall and said left side of said second side wall;

a pair of doors, each having a top, a bottom, a right side, and a left side, such that said left side of said first door is connected to said hinges on said right side of said first side wall and said right side of said second door is connected to said hinges on said left side of said second side wall and said right side of said first door and said left side of said second door touch when said doors are in a closed position; and a pair of door stops connected to said bottom of said doors such that said door stops keep said doors from swinging open by maintaining said closed position.

8. The cargo box of claim 3 further comprising:

a safety chain having two ends and connected on one said end to said top of said first door;

a ring connected to said other end of said safety chain;

a J-shaped hook having a straight end and a hooked end and formed such that a transverse aperture is in said straight end and connected to said ring such that said ring passes through said transverse aperture;

a U-shaped staple of such a dimension that said hooked end of said J-shaped hook fits in said staple and connected to said second door; and, a flat, rectangular hasp connected to said first door and formed with a vertical slot of such dimension that said slot fits over said U-shaped staple when said first and said second door are in a closed position.

9. The cargo box of claim 3 further comprising:

an L-shaped bracket connected to said frame at said left side of said first side wall;

a plurality of eyelet brackets connected to said right side of said first side wall; and an L-shaped bolt having a short side and a long side and connected to said L-shaped bracket such that said short side of said bolt rests on top of said bracket and connected to said eyelet brackets such that said long side of said bolt passes through said eyelet brackets for the purpose of engaging a hole in the floor of a cargo compartment to immobilize said cargo box.

10. The cargo box of claim 3 wherein said sidewalls have a sloping top such that said top of said first side wall is higher at said left side than said right side and said top of said second side wall is higher at said right side than said left side.

11. A cargo box comprising:

a rectangular frame having a front, a back, a right side, and a left side;

a plurality of elongated, rectangular panels connected to said frame such that said panels form a bottom, a back wall, a right wall, and a left wall for said cargo box;

a right front side panel having a top, a bottom, a right side, and a left side and connected to said frame such that said right side of said right front side panel connects to said panel forming said right wall of said cargo box;

a left front side panel having a top, a bottom, a right side, and a left side and connected to said frame such that said left side of said left front side panel connects to said panel forming said left wall of said cargo box;

a plurality of hinges connected to said left side of said right front side panel and said right side of said left front side panel;

a right door having a top and a bottom and connected to said hinges of said right front side panel;

a left door having a top and a bottom and connected to said hinges of said left front side panel; and, a pair of door stops connected to said right and said left door such that said first door stop is connected to said bottom of said right door and said second door stop is connected to said bottom of said left door for the purpose of holding the doors in a closed position.

12. The cargo box of claim 11 further comprising:

a plurality of guide rails; and a plurality of wheels connected to said frame on said right side and said left said such that said wheels are placed on top of said guide rails.

13. The cargo box of claim 12 wherein said guide rail further comprises:

an elongated bar having two ends and a base portion and formed such that said ends are bent in an upward perpendicular direction from said base portion; and a cylindrical rod having two ends and connected to said bar such that said first end of said rod is connected to said first end of said bar and said second end of said rod is connected to said second end of said bar in such a way that said rod is suspended above said base portion of said bar.

14. The cargo box of claim 13 wherein said wheels have an outer edge, a middle portion, and an inner edge and are formed such that said outer edge and said inner edge have the same diameter and said middle portion is arced in a concave direction to said outer edge and said inner edge such that a groove is formed.

15. The cargo box of claim 14 wherein said grooves of said wheels are placed on top of said rod of said guide rail such that said rod forms a track along which said wheels can easily roll.

16. The cargo box of claim 11 wherein said left side panel further comprises:
- an L-shaped bracket connected to said frame at said left side of said left front side panel;
- a plurality of eyelet brackets connected to said right side of said left front side panel; and
- an L-shaped bolt having a short side and a long side and connected to said L-shaped bracket such that said short side of said bolt rests on top of said bracket and connected to said eyelet brackets such that said long side of said bolt passes through said eyelet brackets for the purpose of engaging a hole in the floor of a cargo compartment to immobilize said cargo box.

17. The cargo box of claim 11 further comprising:
- a safety chain having two ends and connected on one said end to said top of said left door;
- a ring connected to said other end of said safety chain;
- a J-shaped hook having a straight end and a hooked end and formed such that a transverse aperture exists in said straight end and connected to said ring such that said ring passes through said transverse aperture;
- a U-shaped staple of such a dimension that said hooked end of said J-shaped hook fits in said staple and connected to said right door; and,
- a flat, rectangular hasp connected to said left door and formed with a vertical slot of such dimension that said slot fits over said U-shaped staple when said right and said left doors are in a closed position.

18. The cargo box of claim 11 wherein said panels are made of a sturdy, lightweight material such as aluminum mesh.

19. The cargo box of claim 11 wherein said right front side panel has a sloping top such that said top of said right front side panel is higher at said right side than said left side.

20. The cargo box of claim 11 wherein said left front side panel has a sloping top such that said top of said left front side panel is higher at said left side than said right side.

* * * * *